(12) United States Patent
Peuser

(10) Patent No.: US 7,919,884 B2
(45) Date of Patent: Apr. 5, 2011

(54) VOLTAGE SUPPLY DEVICE HAVING A PLURALITY OF GENERATORS CONNECTED IN PARALLEL

(75) Inventor: Thomas Peuser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 11/666,181

(22) PCT Filed: Aug. 25, 2005

(86) PCT No.: PCT/EP2005/054173
§ 371 (c)(1),
(2), (4) Date: Oct. 3, 2008

(87) PCT Pub. No.: WO2006/045654
PCT Pub. Date: May 4, 2006

(65) Prior Publication Data
US 2009/0066159 A1    Mar. 12, 2009

(30) Foreign Application Priority Data
Oct. 23, 2004   (DE) .......................... 10 2004 051 742

(51) Int. Cl.
*H02J 1/10* (2006.01)
(52) U.S. Cl. ......................................................... 307/44
(58) Field of Classification Search .................... 307/44, 307/45, 64; 322/29, 32, 28
See application file for complete search history.

(56) References Cited

U.S. PATENT DOCUMENTS

| | | | |
|---|---|---|---|
| 4,829,228 A | 5/1989 | Buetemeister | |
| 5,233,229 A | 8/1993 | Kohl et al. | |
| 5,254,936 A | 10/1993 | Leaf et al. | |
| 5,723,972 A | 3/1998 | Bartol et al. | |
| 5,899,286 A * | 5/1999 | Yamaguchi | 180/65.21 |
| 6,044,923 A | 4/2000 | Reagan et al. | |
| 6,255,805 B1 * | 7/2001 | Papalia et al. | 323/207 |
| 6,621,250 B1 * | 9/2003 | Ohkubo et al. | 320/136 |
| 7,592,784 B2 * | 9/2009 | Qi et al. | 322/24 |
| 7,743,616 B2 * | 6/2010 | Renken et al. | 62/134 |

FOREIGN PATENT DOCUMENTS

| | | |
|---|---|---|
| DE | 41 08 861 | 10/2002 |
| EP | 0 340 913 | 11/1989 |
| JP | 4-38131 | 2/1992 |
| JP | 11-122814 | 4/1999 |
| JP | 2000-295770 | 10/2000 |

OTHER PUBLICATIONS

International Search Report, PCT International Patent Application No. PCT/EP2005/054173, dated Nov. 30, 2005.

* cited by examiner

*Primary Examiner* — Albert W Paladini
(74) *Attorney, Agent, or Firm* — Kenyon & Kenyon LLP

(57) ABSTRACT

A device for voltage supply includes a first generator and a second generator connected in parallel to it. A control unit is also provided, to which capacity utilization signals are made available by the first and the second generator. By an evaluation of the capacity utilization signals, the control unit ascertains control signals, which lead to a uniform load distribution with respect to the generators.

13 Claims, 2 Drawing Sheets

VOLTAGE SUPPLY DEVICE HAVING A PLURALITY OF GENERATORS CONNECTED IN PARALLEL

FIELD OF THE INVENTION

The present invention relates to a device for voltage supply, for instance, for users of a vehicle electrical system of a motor vehicle, having a plurality of generators connected in parallel.

BACKGROUND INFORMATION

It is conventional that one may connect generators in parallel for supplying voltage to users. In this context, typically the power terminals of several series-wound generators designed for individual operation are connected in parallel without additional control devices or modifications. Load balancing has taken place, up to now, mainly by the internal resistance and by the negative temperature coefficient of the controller of the respective generator. In the case of conventional battery generator systems that are thermally tightly coupled, the temperature coefficient is used to ensure a sufficient battery load for all operating and temperature conditions. In these conventional systems, because of the internal resistance and negative temperature coefficient mentioned, a sufficiently balanced condition with regard to generator capacity utilization can be achieved. In this instance, the temperature coefficient has the following effect: The higher loaded generator heats up more than the less highly loaded generator. Because of the negative temperature coefficient, the output voltage of greater loaded generator drops, and with that, so does its load.

In the last few years, because of general advances in controller technology, the internal resistance of the controllers of the generators has been able to be significantly reduced, in part, by more than 80%. An additional trend in automotive technology led to a displacement of the battery from the engine compartment to places that are thermally uncoupled from the generator, for instance, to the trunk of the respective vehicle. Because of this, regulation of the charging voltage that was a function of the generator temperature became nonsensical. For this reason, increasingly, controllers are used that have a temperature coefficient of zero.

This lessening of the influence of the internal resistance and of the temperature coefficient as actuating variables leads to a balancing of generators that is clearly lower all the way to not being present any more, in response to their being connected in parallel.

Voltage differences between generators connected in parallel can come about, for instance, as a result of manufacturing variances, and lead to a different current output of the generators.

In the case of a different capacity utilization of the generators, increased wear of the more greatly loaded generator occurs as an undesired effect. This leads to an abbreviation of the service life of the overall system, which includes a plurality of generators that are connected in parallel.

A device for voltage supply in a motor vehicle, having generators connected in parallel, is described in German Published Patent Application No. 41 08 861. In this conventional device, a voltage regulator is assigned to each generator. In addition, the device has at least one battery whose one terminal can be connected to a voltage regulator via an ignition switch. Furthermore, a charge control device is provided that is in connection with the ignition switch and the voltage controllers, and is able to be connected via a switching device to the negative terminal of the battery which is preferably at ground. Between the charge control device, the voltage regulators and the switching device mentioned, there is a switching device having a plurality of components that conduct in one direction and block in one direction. By this device, it is supposed to be achieved that, by using two generators, high electric power can be generated, and the two generators and voltage regulators using a single indicator, for instance a charge control lamp, are able to indicate occurring errors in one of the two generator-voltage regulator systems, the other generator voltage regulator system being able to continue working without a problem.

SUMMARY

By contrast, a device for voltage supply having the features described below according to example embodiments of the present invention provides that an unequal load distribution with respect to the generators that are connected in parallel is avoided or at least greatly reduced. This happens because of an additional control unit, that is provided to ascertain the capacity utilization of each of the generators, that is connected in parallel, and to generate suitable control signals, based on which the output voltages made available by the generators in each case are influenced such that the load distribution is well balanced.

The control unit may be an external control unit situated outside the generator-controller system. Such an arrangement permits using commercial generator-controller systems, Alternatively, the function of the control unit can also be taken over by one of the generator controllers. In this alternative arrangement, no additional external control unit is required.

Further characteristics of example embodiments of the present invention are described in more detail below with reference to the appended Figures.

DETAILED DESCRIPTION

Figure 1:
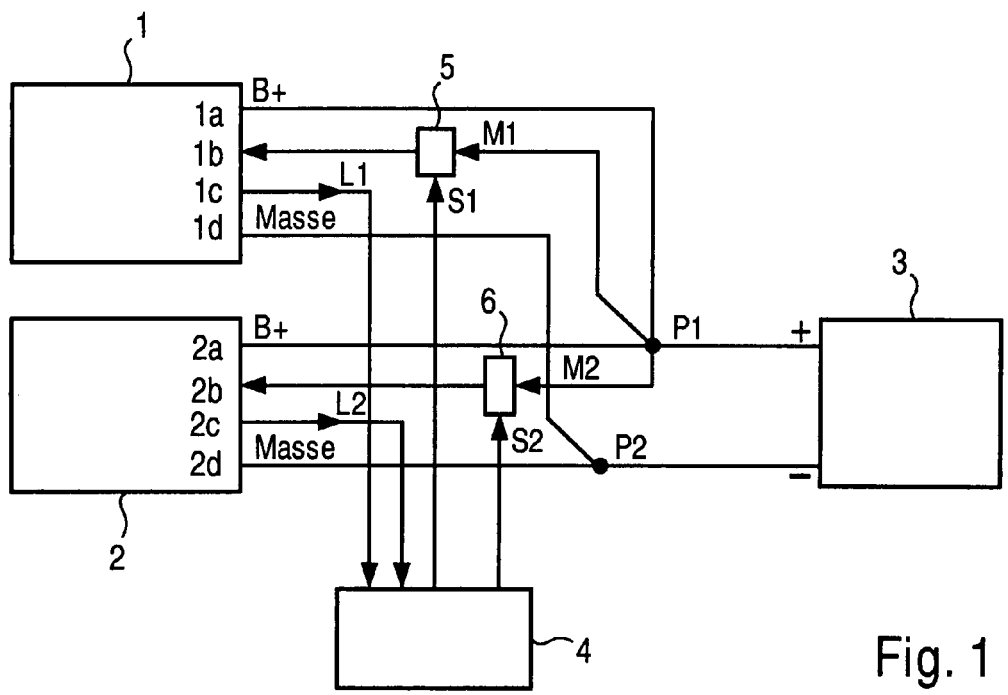
FIG. 1 shows a block diagram of a parallel connection of two generators according to an exemplary embodiment of the present invention.

FIG. 1 shows a block diagram of a parallel connection of two generators according to an exemplary embodiment of the present invention. Generators 1 and 2 shown, which each have an integrated controller, are provided to make available the required energy for the users of the motor vehicle electrical system in the operation of a motor vehicle, and to load a battery 3.

For this purpose, generator 1 has an output 1a, for a positive supply voltage B+, which is connected via a circuit point P1 to the plus pole of battery 3. Generator 2 has an output 2a, for a positive supply voltage B+, which is also connected via circuit point P1 to the plus pole of battery 3.

Moreover, generator 1 is furnished with a ground connection 1d which is connected to the minus pole of battery 3 via ground point P2. Generator 2 is furnished with a ground connection 2d which is also connected to the minus pole of battery 3 via ground point P2.

Moreover, generator 1 has a measuring signal input 1b, to which is supplied a measuring signal M1, derived from circuit point P1, via a first superimposed connection 5. A control signal S1 is supplied to superimposed connection 5 by a control unit 4, and it modifies measuring signal M1 mentioned.

Generator 2 is provided with a measuring signal input 2b, to which a measuring signal M2, that is also derived from circuit point P1, is supplied via a second superimposed connection 6. A control signal S2 is supplied to superimposed connection 6 by a control unit 4, and it modifies measuring signal M2 mentioned.

Generator 1 also has a capacity utilization signal output 1c, at which generator 1 makes available a capacity utilization signal L1. This capacity utilization signal L1 indicates the extent in percent to which generator 1 is being utilized. Capacity utilization signal L1 is supplied to control unit 4.

Generator 2 has a capacity utilization signal output 2c, at which generator 2 makes available a capacity utilization signal L2. This capacity utilization signal L2 indicates the extent in percent to which generator 2 is being utilized. Capacity utilization signal L2 is also supplied to control unit 4.

Control unit 4 has the task of evaluating capacity utilization signals L1 and L2, and of generating control signals S1 and S2 as a function of this evaluation, which are supplied to superimposed connections 5 and 6. By the evaluation mentioned, it is detected whether the capacity utilization of the respective generator is too high or too low. Based on this information, measuring signals M1 and M2 are influenced such that the output voltages of the respective generator are lowered or increased, so that the load distribution is well balanced. In this manner, a dynamic balancing of the output voltages and also of the output currents is achieved.

According to example embodiments of the present invention, it is assumed that asymmetrical load distribution comes about because of the different output voltages of the generators, which are connected in parallel with each other. If the output voltage is too low, the generator current is also too low, and if the output voltage is too high, the generator current is too great, in each case with reference to the other generator(s), that is. By an influencing of the measuring signal that is supplied to the respective generator, the generator voltage can be manipulated. If voltage changes appear at the measuring signal input, the controller of the generator attempts to compensate for this. If the voltage at the measuring signal input drops, the controller takes care of an increase in the output voltage of the generator. If the voltage at the measuring signal input rises, the controller takes care of a lowering in the output voltage of the generator. At its capacity utilization signal output, the respective generator makes available information of the instantaneous capacity utilization of the generator. By an evaluation of the capacity utilization signals of all generators connected in parallel, the control unit ascertains for each of the generators whether it is generating more or less than a desired proportion of the overall current, and makes available control signals based on which the generator voltage, and thus also the generator current of each generator is changed in the sense of a symmetrical load distribution to all the generators.

The evaluation of capacity utilization signals L1, L2 and the generation of control signals S1, S2 will be explained in greater detail below.

Capacity utilization signals L1 and L2 are present in the form of pulse-width modulated signals (PWM signals). The control unit first ascertains an average value, e.g., an average value over time, of each of the capacity utilization signals. This average value over time represents the current generator capacity utilization, which is designated as DFMc below. This value is conditioned, logically inversely, by the generator used: a small DFMc value corresponds to a high generator capacity utilization.

Control unit 4 then ascertains an average value $\overline{DFMc}$ from all DFMc values, e.g., the arithmetic average.

Subsequently, control unit 4 ascertains for each generator the difference between the average $\overline{DFMc}$ and the respectively appertaining DFMC value. If this difference is positive, the generator capacity utilization is too high. On the other hand, if this difference is negative, the capacity utilization is too low. This is represented in the following equation:

$$>0 \rightarrow DFMc < DFM_{soll} \Rightarrow \text{capacity utilization too high}$$
$$\overline{DFMc} - DFMc$$

$$<0 \rightarrow 3DFMc < DFM_{Soll} \Rightarrow \text{capacity utilization too low.}$$

Control unit 4 makes available a control signal to the respective superimposed connection, as a function of the respectively ascertained difference, and the control signal is added, for example, to the respective measuring signal. The modified measuring signal arrives at the measuring signal input of the respective generator and is used by the controller of the generator to make the desired change of positive supply voltage B+, that is made available by the generator.

The slope of the control characteristics may be adjusted by a parameter s:

$$M_b = M + s(\overline{DFMc} - DFMc).$$

where:
$M_b$ is the voltage value available to the generator at its measuring signal input,
M is the voltage value picked off at tapping point P1,
s is the slope of the control characteristics,
$\overline{DFMc}$ is the arithmetic average of the instantaneous generator capacity utilization values and
DFMC is the value of the current generator capacity utilization, which corresponds to the average over time of generator capacity utilization signals L1 and L2.

In the case of an addition of positive voltages to measuring signal M1 and M2, since one would need an operating voltage which would be greater than the voltage of the measuring signal, and thus also mostly greater than the output voltage of the generator, and would thus be the highest available voltage in the system, only the negative part of the difference signal is considered, so that the measuring signal is correspondingly weakened. The voltage of the overall system is thereby regulated to the highest output voltage, that is, to the generator that is most greatly loaded. This type of regulation saves having an additional supply voltage.

Figure 2:
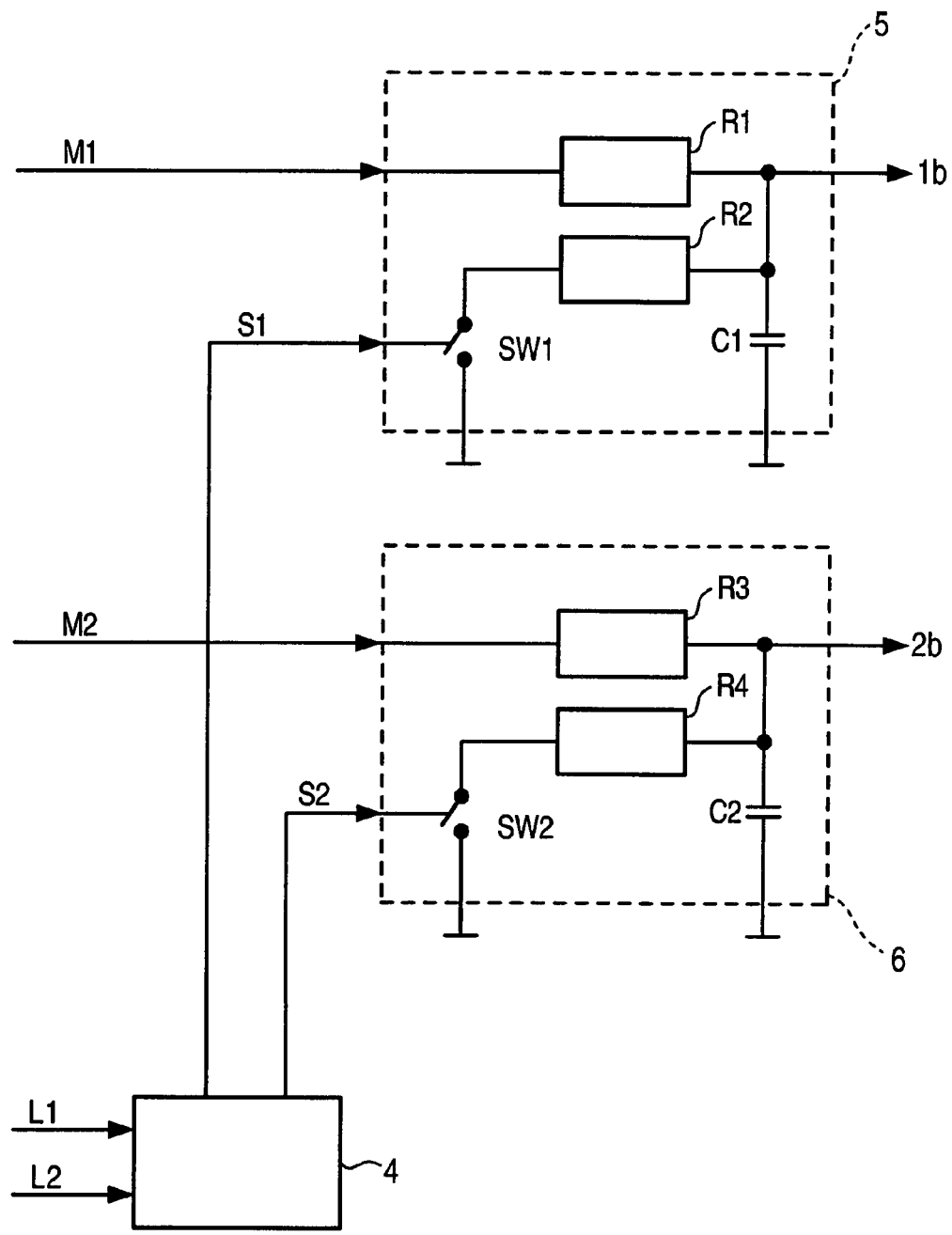
FIG. 2 shows a detailed circuit diagram to illustrate blocks 4, 5 and 6 of FIG. 1.

A more detailed representation of blocks 4, 5 and 6 shown in FIG. 1 is the subject matter of FIG. 2. In FIG. 2, control unit 4 is implemented in the form of a digital controller. This digitally reads in capacity utilization signals L1 and L2, calculates the correction parameters and subsequently outputs the regulating values. To do this, only a digital/analog conversion is required at the output. This can be implemented, for example, by the method described above, having voltage generation at the output or by using a switch which applies the measuring signal to ground in pulsed fashion, via a pulse-width modulation. The signal, that is then low-pass filtered, can be applied directly to the measuring signal input of the generator. In such a design approach, any analog circuit component can be omitted, except for the low-pass filter.

FIG. 2 illustrates such an implementation. Capacity utilization signals L1 and L2 are supplied to digital controller 4 shown there. From this, the controller ascertains the respective correction parameters and outputs regulation values S1, S2 to a switch SW1, SW2, which has R2/C1, R4/C2 postconnected to it. The output signal of the low-pass filter is superposed on measuring signal M1, M2 that is guided by additional resistors R1, R3. The overall signal obtained by this superposition is supplied to measuring signal input 1b, 2b of the respective generator.

There are various possibilities for implementing the digital controller. Among these are, for instance, also design approaches that use a microprocessor, a microcontroller, an FPGA or an ASIC.

Certain refinements undertake changes in the characteristics of the generator-controller system, modify the control parameters by other control units such as the engine control, and implement additional generator-specific functions.

Figure 3:
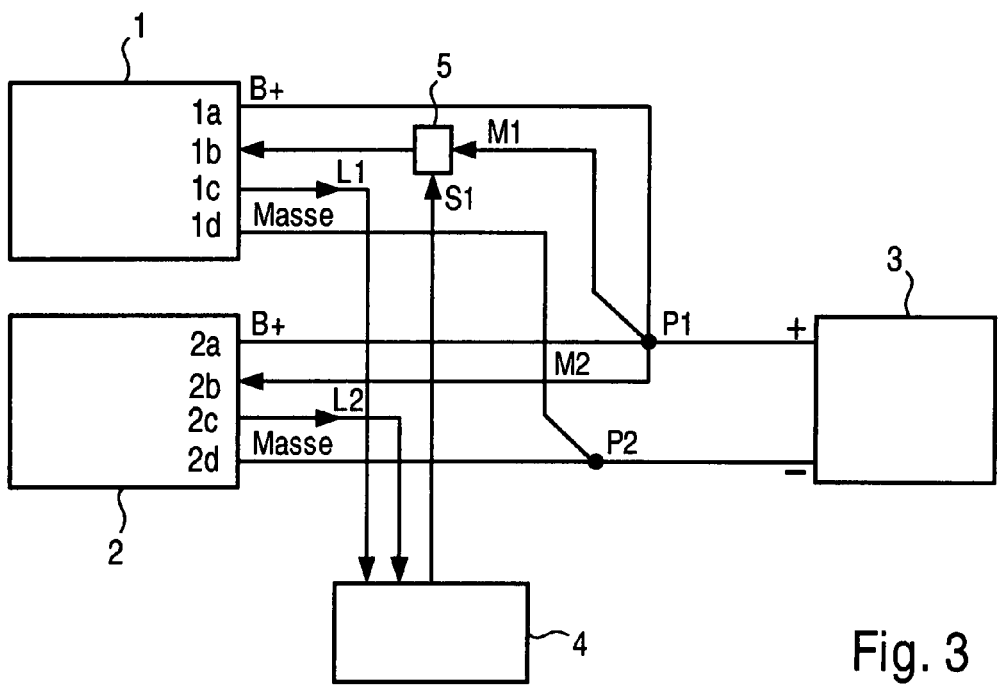
FIG. 3 shows a block diagram of a parallel circuit of two generators according to an exemplary embodiment of the present invention.

FIG. 3 shows a block diagram of a parallel connection of two generators according to an exemplary embodiment of the present invention. This differs from the exemplary embodiment shown in FIG. 1 in that a superposed connection 5 is preconnected only to generator 1. In this example embodiment, the measuring signal can be increased and also decreased in superposed connection 5, so that measuring signal input 1b has a modified measuring signal supplied to it that is greater or less than measuring signal M1, as a function of whether output voltage B+ of generator 1 has to be reduced or increased to balance the load distribution.

In this exemplary embodiment, if the proportion generator 2 has of the load distribution is too great, the output voltage of generator 1 has to be increased to maintain a uniform capacity utilization of the generators. This takes place by a suitable reduction in measuring signal M1 in superposition connection 5. Based on the reduced measuring signal applied to measuring signal input 1b, the controller of generator 1 provides that the output voltage of generator 1 is increased. This increases the proportion of generator 1 of the load distribution. The proportion of generator 2 has of the load distribution is automatically reduced by this.

In this exemplary embodiment, if the proportion generator 2 has of the load distribution is too small, the output voltage of generator 1 has to be reduced to maintain a uniform capacity utilization of the generators. This takes place by a suitable increase in measuring signal M1 in superposition connection 5. Based on the increased measuring signal applied to measuring signal input 1b, the controller of generator 1 provides that the output voltage of generator 1 is reduced. This lowers the proportion generator 1 has of the load distribution. The proportion generator 2 has of the load distribution is thereby automatically increased.

In this exemplary embodiment, since even an increase in measuring signal M1 has to be possible, an additional supply voltage is required which is made available either to control unit 4 or to superposition connection 5.

Nevertheless, example embodiments of the present invention make available a device, having a plurality of generators connected in parallel, in which a uniform capacity utilization of the generators is achieved in a reliable and a cost-effective manner. It is particularly applicable for achieving a symmetrical operation when using modern generators, that is, generators without temperature coefficients and having low internal resistance. However, it can also be used in connection with older generators that have a negative temperature coefficient and high internal resistance. In that case, too, the use of example embodiments of the present invention leads to significant improvements with respect to symmetry, and thus to an extension of the service life of the system.

LIST OF REFERENCE CHARACTERS 1 first generator
1a output for positive voltage supply
1b measuring signal input
1c capacity utilization signal output
1d ground terminal
2 second generator
2a output for positive supply voltage
2b measuring signal input
2c capacity utilization signal output
2d ground terminal
3 battery
4 control unit
5 first superposition connection
6 second superposition connection
C1,C2 capacitors
L1,L2 capacity utilization signals
M1,M2 measuring signals
P1 tapping point for measuring signal
P2 ground point
R1,R2,R3,R4 ohmic resistors
S1,S2 control signals
SW1,SW2 switch

What is claimed is:

1. A device for voltage supply, comprising:
a first generator having a first output for a positive supply voltage, a first input for a first load adjustment measuring signal and a first capacity utilization signal output;
a second generator connected in parallel to the first generator, having a second output for a positive supply voltage, a second input for a second load adjustment measuring signal and a second capacity utilization signal output;
a control unit to generate a first control signal representing a first generator load change derived from the first capacity utilization signal output and from the second capacity utilization signal output; and
a first superposition connection to combine the first control signal and the first and the second positive supply voltage outputs and generate the first load adjustment measuring signal.

2. The device according to claim 1, further comprising:
a second superposition connection to combine a second control signal and the first and the second positive supply voltage outputs and generate the second measuring signal, wherein the control unit generating generates the second control signal representing a second generator load change derived from the first capacity utilization signal output and from the second capacity utilization signal output.

3. The device according to claim 1, wherein a pulse-width modulated signal is present in each case at the capacity utilization signal outputs and the control unit is configured to calculate an average value of each capacity utilization signal.

4. The device according to claim 3, wherein the control unit is configured to calculate an average value of the average values of all the capacity utilization signals.

5. The device according to claim 4, wherein the control unit is configured to calculate an arithmetic average value of the average values with respect to time of all the capacity utilization signals.

6. The device according to claim 5, wherein the control unit is configured to calculate a difference between the average value with respect to time of a respective generator and the calculated average value of a plurality of capacity utilization signal values from a plurality of generators and generate a control signal for the respective generator as a function of the calculated difference.

7. The device according to claim 6, wherein the first measuring signal that is supplied to the first generator is at least one of (a) decreased and (b) increased in accordance with the first control signal.

8. The device according to claim 1, wherein the control unit includes a digital controller.

9. The device according to claim 1, wherein the combination of the control signal and the first and the second positive supply voltage outputs includes an addition of the control signal and the first and the second positive supply voltage outputs.

10. The device according to claim 1, wherein the first and the second positive supply voltage outputs are coupled to the second measuring signal input.

11. The device according to claim 1, further comprising:
a second superposition connection, wherein the control unit generates a second generator load change derived from the first capacity utilization signal output and from the second capacity utilization signal output and the second superposition connection combines the second control signal and the first and the second positive supply voltage outputs to generate the second measuring signal input.

12. A device for providing a voltage supply, comprising:
a plurality of generators connected in parallel, each having a positive supply voltage output, an input for a load adjustment measuring signal, and a capacity utilization signal output;
a control unit to generate a control signal for each generator representing a load change for a respective generator derived from the capacity utilization signal outputs of the plurality of generators; and
a superposition connection for each generator to superimpose the control signal of a respective generator and the positive supply voltage outputs and generate the load adjustment measuring signal for the respective generator.

13. The device according to claim 12, wherein the superimposing of the control signal of the respective generator and the positive supply voltage outputs includes adding the control signal of the respective generator to a voltage of the positive supply voltage outputs.

* * * * *